Patented Sept. 28, 1948

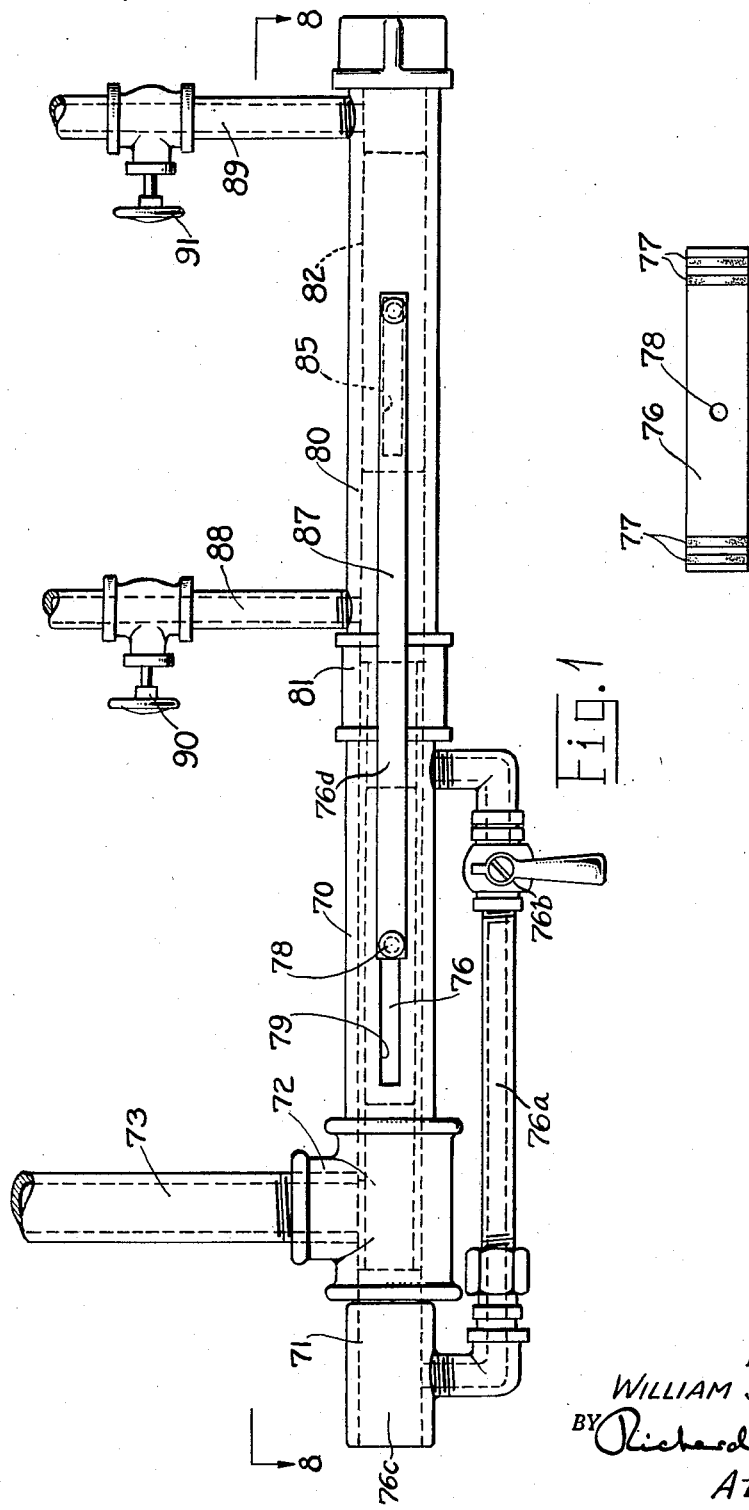

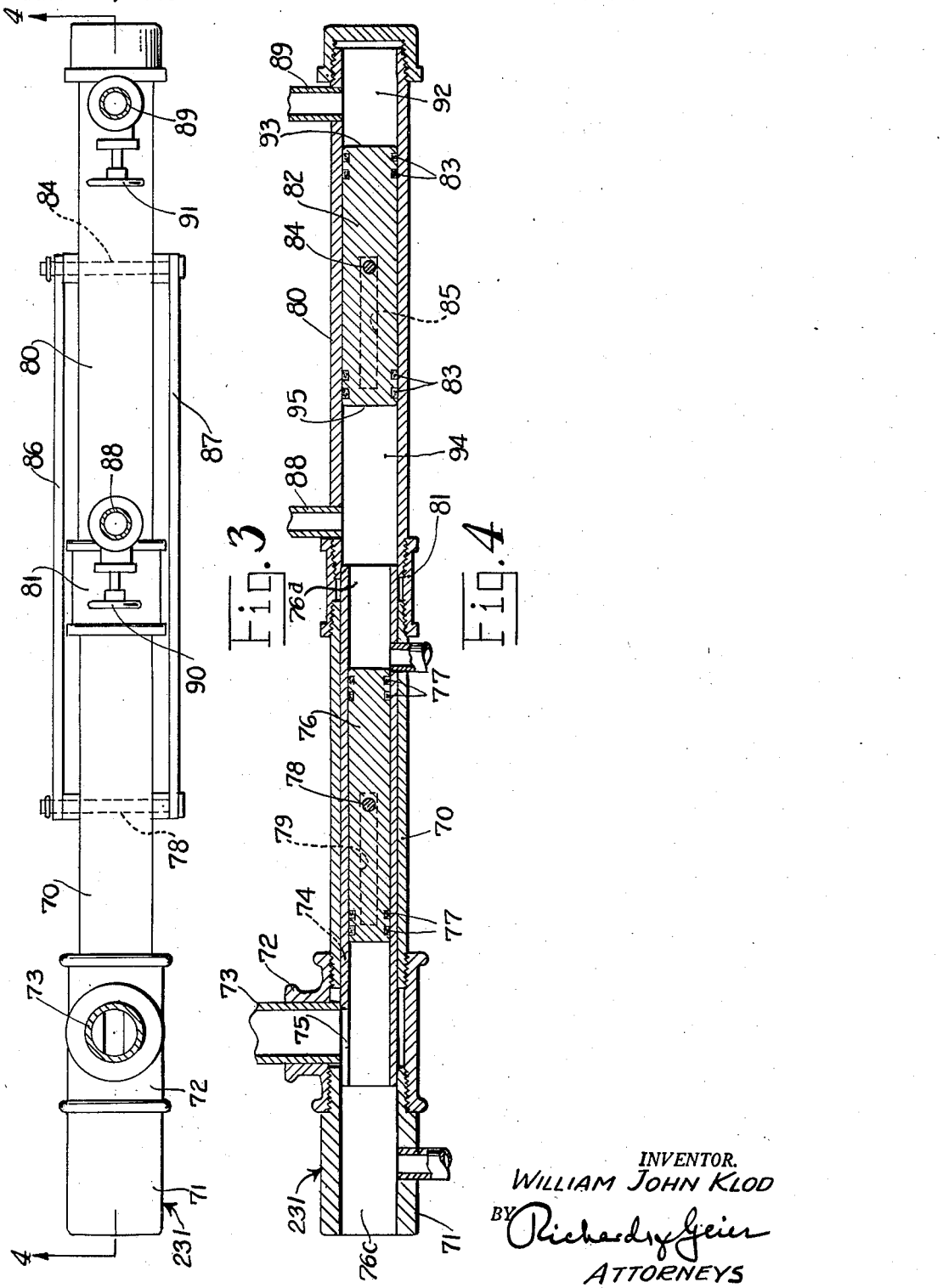

2,450,242

UNITED STATES PATENT OFFICE 2,450,242

VALVE

William John Klod, Weehawken, N. J.

Application March 25, 1944, Serial No. 528,026

3 Claims. (Cl. 137—139)

This present invention relates to valves for liquids and gases. One of its objects is to provide an equalized pressure piston valve of superior character.

Another object is the provision of a built up or solid piston slide valve suitable for high and low pressures.

A further object is the provision of a valve of the character described whose piston is activated in direct line with the trust of pressure of steam, or any other gas, or liquid, or both.

These and other objects are attained by mechanism having a single or double acting piston valve whose normal position is the closed position. The piston axis is in direct line with the axis of movement of the incoming pressure of gas, liquid or both combined, which is directed against the head of the piston. A conduit provided with an equalizer valve and communicating with the cylinder chamber behind the piston may conduct the pressure of gas, liquid, or both, to the bottom of the piston and thus may equalize the pressure on both ends of the piston. A spring connected with the bottom of the piston acts as a pressure regulator when the equalizer valve is closed, and then the spring may provide enough force, to over-balance the pressure on the head of the piston.

A preferred embodiment of the invention is shown in the drawings in which—

Figure 1 is a side elevational view of the valve mechanism constructed in accordance with the principles of this invention.

Figure 2 illustrates the piston of the mechanism shown in Figure 1.

Figure 3 is a top plan view of the valve mechanism shown in Figure 1 with some parts shown in section.

Figure 4 is a sectional view along the line 4—4 of Figure 1.

The valve shown in Figures 1 to 4, includes a cylinder 70 joined to an inlet pipe 71 by a T-connection 72. The T-connection 72 contains an outlet pipe 73 extending at right angles to the inlet pipe 71. A pipe 74 is situated within the cylinder 70 and is firmly connected therewith. The pipe 74 has an opening 75 constituting a continuation of the outlet pipe 73.

A piston 76 reciprocates within the pipe 74 and is provided with the usual piston rings 77. A wristpin 78 extends through the piston 76 and projects through elongated slots 79 which are formed in the pipe 74 and the cylinder 70, and which extend diametrically opposite each other.

Another cylinder 80 is located in alinement with the cylinder 70 and is connected therewith by a union coupling 81. A piston 82 which is provided with piston rings 83, reciprocates within the cylinder 80 and carries a wristpin 84 having ends which project through diametrically opposed longitudinal slots 85. Of course it is a mere matter of choice that separate cylinders 70, 80, joined by union coupling 81 are illustrated, since a single cylinder equalling their aggregate length could be used, the result in either case being a cylindrical casing 23 enclosing both pistons, 76, 82.

The wristpins 78 and 84 are connected with each other by two connecting rods 86 and 87 which extend parallel to and outside of the cylinders 70 and 80.

The cylinder 80 carries two pipes 88 and 89 which are located on opposite sides of the piston 82 and which carry valves 90 and 91, respectively. The pipes 88 and 89 lead to a source of pressure which is not illustrated in the drawings.

It is apparent that due to the provision of the connecting rods 86 and 87, the pistons 76 and 82 will reciprocate as a single unit within the cylinders 70 and 80, respectively. The piston 82 is the driving piston and piston 76 is the driven piston and it serves as a valve body for opening or closing the opening 75 leading to the outlet pipe 73. A conduit 76A comprising a valve 76B interconnects the portions 76C, 76D of casing 23 located forwardly and rearwardly, respectively, of driven piston 76.

When the piston 76 is in the retracted position shown in Figure 4, there is direct connection between the main inlet pipe 71 and the outlet pipe 73, so that the main valve is open.

In order to close the main valve, an operator opens the valve 91 and causes a flow of fluid or fluids under pressure through the pipe 89 and into the chamber 92 of the cylinder 80. Then the pressure exerted upon the surface 93 of the piston 82 will cause it to move along with the piston 76 until the latter closes the opening 75. Then the pressure-exerting medium in the chamber 92 may be removed by any suitable means (not shown).

In order to move the piston 76 from a closed position to an open position shown in Figure 4, the valve 90 is opened and a pressure-exerting medium is caused to flow through the pipe 88 and into the chamber 94 of the cylinder 80. Pressure exerted upon the face 95 of the piston 82 will move the pistons 82 and 76 to the retracted open position shown in Figure 4.

Of course, the left hand portion of the cylinder is reduced in diameter by the pipe 74. Consequently the piston 76 is smaller in diameter than piston 82, and pressure in the chamber 94 acting on the differential area of the pistons is effective to move the piston assembly to the right to open the valve.

It is apparent that the example shown above has been given solely by way of illustration and not by way of limitation and that the above described illustrations are subject to wide variations and modifications without departing from the scope or intent of the present invention. All of such variations and modifications are to be included within the scope of the present invention.

What is claimed is:

1. A valve comprising in combination, a cylinder, a piston within said cylinder, a pressure fluid inlet formed in an outer end of said cylinder, a pressure fluid outlet extending at right angles to said inlet and constituted by an opening which is formed in a side of said cylinder and which is adapted to be closed and opened by said piston, pressure conducting means interconnecting the portions of said cylinder forward and rearward of said piston, valve means controlling said pressure conducting means, another cylinder in alinement and in direct open communication with the first mentioned cylinder and located behind the inner end thereof, means reducing the diameter of the first cylinder relative to the second said cylinders each having longitudinal slots therein, another piston in said other cylinder, wrist pins on said pistons extending through the cylinder slots, means connecting said wrist pins, and means connected with said other cylinder for introducing an actuating medium thereinto and into engagement with any one of the two end surfaces of said other piston.

2. A valve comprising in combination, a cylinder, a piston within said cylinder, a pressure fluid inlet formed in an outer end of said cylinder, a pressure fluid outlet extending at right angles to said inlet and constituted by an opening which is formed in a side of said cylinder and which is adapted to be closed and opened by said piston, pressure conducting means interconnecting the portions of said cylinder forward and rearward of said piston, valve means controlling said pressure conducting means, another cylinder in alinement with the first-mentioned cylinder and located behind the inner end thereof, the bore of the second cylinder being substantially greater than the bore of the first-mentioned cylinder, said two cylinders having longitudinal slots formed therein, wrist pins carried by said pistons and extending through said slots, at least one connecting rod interconnecting said wrist pins, two pipes connected with said other cylinder and located at opposite ends thereof and beyond opposite ends of said other piston, and valves carried by said two pipes, whereby an actuating medium may be introduced into said other cylinder and into engagement with any one of the two end surfaces of said other piston.

3. A valve comprising a cylindrical casing having a continuous bore therein, said casing comprising a fluid pressure inlet formed therein, said casing further comprising a fluid pressure outlet formed in the wall thereof, a driving and a driven piston spaced apart and slidable in said casing bore, the driven piston having a substantially smaller diameter than the driving piston, means spaced on either side of the casing connecting said pistons, said driven piston being adapted by so sliding to open and close said outlet, said casing further comprising portions located forward and rearward of each of said pistons in all positions thereof, means constituting an interconnection adapted to conduct fluid pressure between the portions forward and rearward of said driven piston, independently adjustable means of interrupting said interconnection, and pressure conducting means to the portions of said casing located forward and rearward of said driving piston.

WILLIAM JOHN KLOD.

REFERENCES CITED

The following references are of record in the file of this patent:

UNITED STATES PATENTS

| Number | Name | Date |
| --- | --- | --- |
| 668,202 | Nethery | Feb. 19, 1901 |
| 1,317,668 | Shively | Sept. 30, 1919 |
| 1,609,954 | McGrew | Dec. 7, 1926 |
| 1,702,550 | Stevenson | Feb. 19, 1929 |
| 1,715,665 | Mason | June 4, 1929 |
| 1,880,186 | Knauf | Sept. 27, 1932 |
| 1,995,561 | Belanger | Mar. 26, 1935 |

FOREIGN PATENTS

| Number | Country | Date |
| --- | --- | --- |
| 362,110 | Great Britain | Dec. 3, 1931 |